INVENTOR.
Edward C. VanBuskirk
BY Norbert P. Holler
ATTORNEY

Feb. 9, 1971  E. C. VAN BUSKIRK  3,562,082
FLEXIBLE HIGH-STRETCH LAMINATE WITH SURFACE SKINS
AND COILED-FILAMENT NON-WOVEN FABRIC SPACER
Filed Oct. 27, 1967  4 Sheets-Sheet 4

INVENTOR.
EDWARD C. VAN BUSKIRK
BY Norbert P. Holler
ATTORNEY

United States Patent Office 3,562,082
Patented Feb. 9, 1971

3,562,082
FLEXIBLE HIGH-STRETCH LAMINATE WITH SURFACE SKINS AND COILED-FILAMENT NON-WOVEN FABRIC SPACER
Edward C. van Buskirk, South Bend, Ind., assignor to Uniroyal, Inc., New York, N.Y., a corporation of New Jersey
Filed Oct. 27, 1967, Ser. No. 678,676
Int. Cl. D04h 3/07, 13/00
U.S. Cl. 161—47                                            32 Claims

ABSTRACT OF THE DISCLOSURE

A flexible laminate designed for use in the form of internally open high-stretch sheet materials having high compression resistance. The laminate is composed of two surface layers or skins secured to an intermediate elastic non-woven spacer fabric having high multi-directional stretchability provided by transversely intersecting warps and fillings of resilient highly extensible coil strands of mono-filamentary nature. The spacer fabric is made by forming a first coil strand single layer structure, forming a second coil strand single layer structure so that the coil strand reaches of the latter overlie and cross the coil strand reaches of the first layer on one side of the latter only, and compacting the two coil strand layers into one another so that the coil strand reaches of each layer are entangled with the crossing coil strand reaches of the other layer from one side only and are interconnected so as to become a cohesive structure in which the axes of all the coil strand reaches are in a single common plane. The surface layers or skins may be either permeable or impermeable sheet materials.

---

The foregoing abstract is not to be taken either as a complete exposition or as a limitation of the present invention, and in order to understand the full nature and extent of the technical disclosure of this application, reference must be had to the following detailed description and the accompanying drawings as well as the claims.

BACKGROUND OF THE INVENTION

This invention relates to a novel class of flexible and elastic laminates embodying an intermediate non-woven spacer fabric between two sheet material skins.

Although, as will hereinafter appear, the present invention is applicable to a variety of fields, one of its major uses to which the following description will be primarily addressed is in the manufacture of controlled environment wearing apparel.

In the field of controlled environment wearing apparel such as space and diving suits, the use of insulating laminated sheet materials has been found to be highly desirable. Merely by way of example, certain types of diving suits presently known are made of laminates composed of an inner layer of an open-cell thermally insulating sponge or foam material sandwiched between two surface skins of fluid-impervious rubbery or synthetic plastic films or like sheet materials. By their very nature, such laminates are possessed of relatively low resistance to compression, so that when they are used under high external pressures, such as at relatively great depths below the surface of a body of water, they usually have to be pressurized internally to resist collapse. In addition to the foregoing, these laminates also have relatively limited stretchability characteristics. Moreover, any attempt to enhance the property of compression resistance necessarily involves a compromise in the area of stretchability, while any attempt to enhance stretchability necessarily entails a compromise of either the compression resistance of the laminate or its insulating value or both.

SUMMARY OF THE INVENTION

It is an important object of the present invention, therefore, to provide a novel type of laminate which is highly elastic and stretchable in all directions in the plane thereof, and which at the same time is highly flexible yet possessed of considerable resistance to compression in a direction transverse to the plane of the laminate.

It is another object of the present invention to provide such a laminate having an internal spacer element or core in the form of a special type of non-woven fabric possessed of high flexibility, elasticity and resistance to compression.

A related object of the present invention is the provision of novel forms of the spacer fabric as well as of methods for making the same.

Yet another object of the present invention is the provision of a laminate as aforesaid which can be internally heated or cooled as desired.

Generally speaking, a laminate according to the present invention comprises a pair of surface layers or skins of substantially flat or two-dimensional sheet material sandwiching therebetween a three-dimensional non-woven fabric core or spacer composed of two sets of highly resilient spring-like mono-filamentary coil strand reaches (these terms will be more fully defined hereinafter) which are arranged in the sense of warps and fillings, the two sets of coils being compacted from two parallel plane structures each disposed on one side only of the other into a uniplanar or single-layer three-dimensional structure the thickness of which is determined by the widths or cross-sectional dimensions of the coil turns.

It should be noted at this point that one form of the aforesaid special non-woven fabric, which is used as the spacer or core of the laminate according to one aspect of the present invention, per se does not constitute a part of my invention, being fully described and claimed in the copending application of R. N. Steel, Ser. No. 678,751, filed of even date herewith and assigned to the same assignee as the instant application. The disclosures of the said Steel application are, accordingly, hereby incorporated herein by reference, but for purposes of completeness and ease of understanding, the pertinent portions of the description of the fabric contained in the said Steel application will be repeated herein substantially in full.

More particularly, one class of materials of which the coil strands forming a non-woven spacer fabric to be used as a core in flexible and elastic laminates according to my invention generally may be made can be denoted (as pointed out in the said Steel application) as rigid and semi-rigid, including filaments of glass, metal wire (including high resistance wire), polyvinyl chloride and other vinyl resins, nylon, polyester, polyethylene, polypropylene, isotactic polystyrene, polycarbonate, acrylic resin, acrylonitrile-butadiene-styrene (ABS) resin, cellulose acetate and other organic acid esters and ethers of cellulose, and the like. Another class of suitable materials can be denoted as soft and resilient, including spandex polyurethane thread, uncured latex and cut rubber threads, filaments of plasticized polyvinyl chloride, and the like. Such coil strands can also be made of such materials as cotton or rayon threads, paper yarns or threads, and the like, suitably impregnated, preferably prior to the coil-forming operation, with such materials as heat-curable or room temperature vulcanizing thermosetting polyester and epoxy resins, hot melts of thermoplastic resins, vinyl latices, urethane latices, natural and synthetic rubber latices, and the like.

In the case of high resistance wires, of course, which would be used for electrical heating as will be more fully described presently and which thus can be made of any of the well known materials best suited for that function (e.g. "Nichrome" or "Monel" wire, nickel steel, German silver, etc.), they would preferably (although not necessarily) be covered with some suitable electrical insulation. Among the electrically non-conductive coating materials which can be used are thermosetting and thermoplastic resins such as phenol formaldehyde, urea formaldehyde, polyvinyl acetate, polyvinyl chloride, rosin, polyurethane, polyvinyl formal, polyethylene and esterified rosin; natural rubber and such synthetic rubbers such as SBR, neoprene, ethylene-propylene terpolymer (EPDM) and butyl; and suitable fabrics made of such fabrics as silk, cotton, polyester, wool, and the like.

As further disclosed in the Steel application, the spacer fabric may be formed with one or both of the sets of multiple individual coil strands either stretched or unstretched prior to the compaction of the two layer structures. In accordance with my invention, each or even both of the respective layer structures may also be formed of a single serpentine or sinuous coil strand of appropriate length, with the long reaches of each strand being oriented crosswise to those of the other. Irrespective of which method is used to form the fabric, in the case where the coils are initially stretched prior to the compaction, their retraction upon release of the stretching forces after the compaction causes them to become mechanically locked to each other at their regions of intersection. If desired, the fabric so produced may in addition be treated with a suitable "binder" capable of either physically tying or adhesively bonding the various coils to one another at their points of intersection as well. On the other hand, where the coils are compacted without being first stretched, with the result that they lie more or less loosely one within the other, then the application of such a "binder" to the points of intersection or, if the nature of the coil strand material permits, a fusion of the strands at such points of intersection, would be required. Where desirable for coil protection purposes, a sufficient quantity of the "binder" material may be supplied to the fabric so as to ensure an adequate coating on the entire surfaces of the various coil strands.

By virtue of such a construction, wherein the spring-like, highly extensible and resilient coil strands of which the spacer fabric is made extend both warpwise and weftwise of the fabric, the same is rendered elastically stretchable in all directions in the plane thereof, i.e. the plane containing the axes of the coils, while the disposition of the turns of the coil strands in planes substantially perpendicular to the plane of the fabric imparts to the latter high flexibility and a relatively high resistance to compression. Further, since the coils can be shaped to have any desired effective diameter, the making of the spacer fabric with any given thickness requires only the use of coils of an appropriate cross-sectional dimension, and to make such a fabric of any relatively great thickness it is generally not necessary to superpose on and bond to one another a plurality of fabric plies of lesser thicknesses.

The "binders" which may be employed in the making of the aforesaid spacer fabric are preferably of such a nature as to act as an adhesive for bonding the coil strands to each other at their cross-over points. It is contemplated, however, that the "binders" may only encapsulate the coil strands at the cross-over points so as to tie or bind them together in the mechanical or physical sense. Materials which are found well suited for these purposes are dispersions of plastics and rubbers such as vinyl chloride latices, acrylic latices, natural and synthetic rubber latices, urethane latices, plastisols, organosols, etc., and solutions of rubbers and plastics, including solutions of elastomers such as buna-N and neoprene rubbers, and solutions of plastics such as polyvinyl chloride, polyurethane, vinylidene chloride, etc.

To form the laminate according to my invention, a spacer fabric such as outlined hereinabove is faced and adhered at each surface to a respective essentially flat or two-dimensional skin-forming sheet. For the field of controlled environment apparel in particular, and especially outer wear, these skins are preferably impermeable films or sheets of an elastomeric or plastic material, which films or sheets may be self-supporting or reinforced. Among the elastomers which can be used for this purpose are such as natural rubber, neoprene, butyl rubber, EPDM and the like, while the plastics would include such as polyvinyl chloride, polyethylene, polypropylene, nylon, polyester, polyurethane elastomer, and the like. Where impermeability is not an indispensable property, or where permeability is desired, the skins may be made of conventional or breathable coated fabrics. The two skins or sheets sandwiching a spacer fabric need not be of the same material, of course, and if they are impermeable films either or both may be internally or externally reinforced by fibers or fabrics of such materials as jute, cotton, rayon, nylon, glass, polyester, vinylidene chloride, wire, etc.

The facing sheets or skins may be secured to the respective surfaces of the spacer fabric in any suitable manner, preferably by means of adhesive compositions compatible with the various materials, such as adhesives based on natural rubber, neoprene, chlorinated rubber, butyl rubber, polyurethane, polyvinyl chloride plastisol, and the like. The adhesive may be applied to either or both of the spacer fabric and the surface sheeting, in the form of either continuous or discontinuous films, and may be either self-vulcanizing or heat curable or fusible or of any otherwise setting nature. Where conditions permit, the adhesion may be effected by means of solvents or plasticizers for the spacer and/or skin sheet materials, or by means of heat and/or pressure, or by means of sewing (in the latter case, of course, if impermeability is a factor, a sealant for the needle holes must later be applied). It will be appreciated that in the case of a spacer fabric made of wire, the fabric should preferably be coated with a "binder" capable of enhancing the adhesion of the surface sheets or films to the spacer fabric. Such a precaution may, of course, not be necessary if the wire is insulated with a material compatible with the adhesives employed. Where the skins are in the form of permeable fabrics, the use of adhesives as the securing agent may necessitate precautions to guard against undesired strike-through of the adhesive.

Laminates according to this invention are highly flexible and stretchable in all directions, and if impermeable have good insulating value by virtue of the internal air space, and admit of conserving or extracting body heat because of the possibility of circulating warm or cool air or other fluid through the laminate. Where the spacer fabric is made of high resistance wire, heating by electricity is also available. Such laminates are thus well suited for use in controlled environment wearing apparel, and by virtue of their high compression resistance even under conditions of extremely high external pressure.

BRIEF DESCRIPTION OF THE DRAWINGS

The foregoing and other objects, characteristics and advantages of the present invention will be more fully understood from the following detailed description thereof when read in conjunction with the accompanying drawings, in which.

PREFERRED EMBODIMENTS

Referring now to the drawings in greater detail, as disclosed in the aforesaid Steel application, the basic structural unit of the non-woven spacer fabrics which are to be used in making laminates according to the present invention is an elongated coil strand made of any suitable materal of the types hereinbefore set forth. Merely by way of example, such a coil strand may be of circular cross-section as indicated at 21 in FIG. 7, or of oval cross-section as indicated at 21a in FIG. 8, or of polygonal (three or more sided) cross-section, e.g. square as indicated at 21b in FIG. 9. These coil strands are shown each with its turns lying closely adjacent one another, but obviously each may have its turns relatively spaced from one another (not shown).

Figure 7:
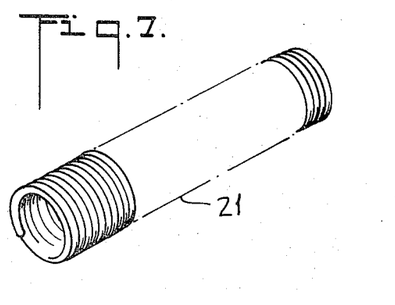
FIGS. 7, 8 and 9 are perspective illustrations of differently shaped coil strands which may constitute the basic structural elements used in the making of the spacer fabric.
Figure 8:
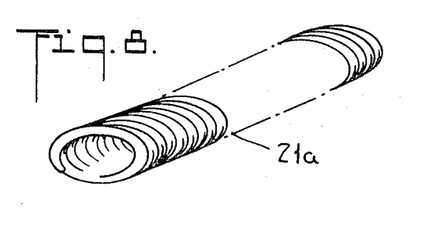
Figure 9:
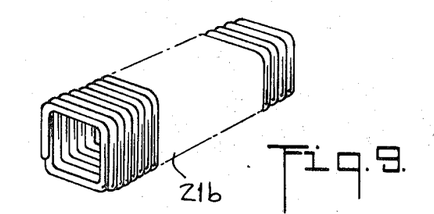

Each strand 21, 21a or 21b is made up of a single "mono-filament" of the material involved, it being understood, however, that the term "mono-filament" is here used in a sense somewhat broader than is usually the case. Thus, this term is intended to designate not only conventional extruded or cut mono-filaments, but also unitary strands formed by treating, through fusion, coagulation, impregnation, twisting, braiding or the like, yarns or threads composed of either bundles of continuous filaments or of spun staple fibers, so as to make them into cohesive structures.

In general, there is one basic method of forming any of the coil strands 21, 21a and 21b irrespective of the nature of the material of which it is made, although it will be appreciated that the nature of any given one of the various materials may require a respective modification of the basic procedure. Thus, where the strand is formed from glass fiber, the molten glass is drawn into the form of a filament of the desired thickness from an orifice of appropriate diameter in conventional manner (or a plurality of thinner filaments are coagulated into a unitary structure), and the resultant mono-filament thereafter, while still in a hot and pliable state, is wound onto a rotating rod of the required cross-sectional shape and size on which it is permitted to set by cooling. Where the mono-filament is a single-strand metallic wire, the wire is cold drawn and wrapped about a mandrel of suitable shape and size (this size generally will be somewhat smaller than the desired final cross-sectional dimensions of the coil to compensate for the inherent springiness of most metals and metal alloys which will be found suited for use in the field of the present invention, e.g. carbon steel, iron, beryllium, aluminum, stainless steel, copper, high electrical resistance alloys, etc.). The mono-filament may, of course, also be a multi-strand wire, e.g. a twisted or braided wire, and may be bare or coated with any desired material, such as vinyl or polyethylene insulation, etc.

On the other hand, when a mono-filament of a thermoplastic material is used, it is wound onto a suitably shaped and dimensioned rod or mandrel (which may be rotated during the winding operation) and, while in that state, is exposed for a predetermined time interval to a relatively elevated temperature, for example in a hot air oven, whereby the filament becomes heat-set in its coiled form. It will be understood that if such a filament is wound onto the mandrel immediately after extrusion and while still hot, it would probably not be necessary to post-heat the filament specially in order to set it in its coiled form.

When the filament is made of uncured latex or cut rubber thread, the same (the composition of which will contain a suitable curing or cross-linking agent) is wound in its uncured state onto a mandrel of the desired size and the entire assembly is then subjected to the necessary thermal and/or radiation conditions to cause the composition to cure and permit the filament to become set in its coiled shape. Where the mono-filament is to be made of thread or yarn of such materials as cotton, rayon, paper and the like, the thread or yarn, having first been impregnated either with a heat-curable or room temperature vulcanizing thermosetting polyester or epoxy resin, or possibly with a rubber or plastic latex or with a hot melt of a thermoplastic material such as polyvinyl chloride, a polyamide resin, cellulose acetate butyrate resin, and the like, is wound onto a mandrel and then exposed to the proper thermal cycles, for example heating in the case of the heat-curable thermosetting resin impregnants or cooling in the case of the hot melt thermoplastic impregnants, whereby it becomes set in its coiled shape.

As a practical matter, the mono-filament of which the basic coil strand is made may have any suitable denier, and the diameter or thickness of the mono-filament is not limited to any particular range of values, since a particular choice of filament diameter or thickness will generally depend on a combination of factors or parameters such as the desired cross-sectional dimensions of the coil, the strength of the material of which the filament is made, the loads and stresses to which the coil strand ultimately will be subjected in use, etc. For the same reasons, as well as for the hereinbefore indicated reason that the coil cross-sectional dimension determines the thickness of the fabric, the coils may also have any cross-sectional dimension which is found desirable or necessary.

Figure 1:
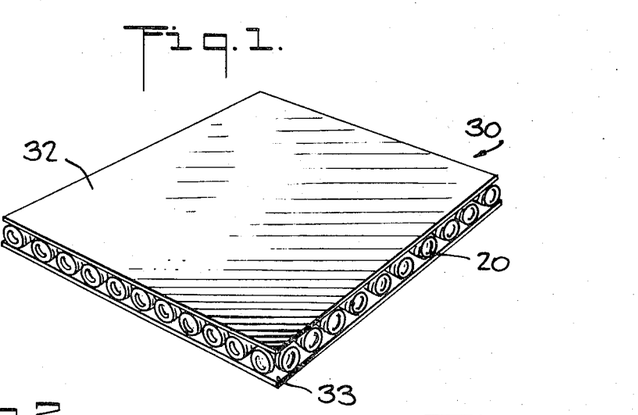
FIG. 1 is a perspective, diagrammatic, plan view of a laminate according to one aspect of the present invention wherein a spacer fabric composed of two sets of separate coil strands is used.
Figure 10:
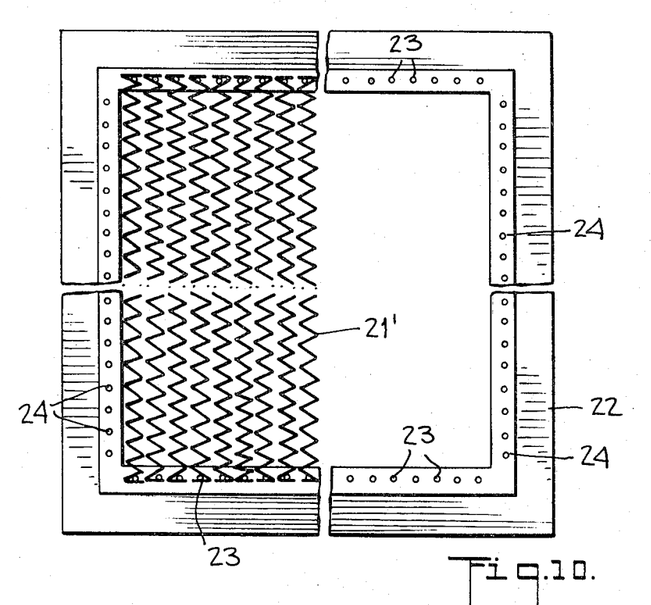
FIG. 10 is a top plan view of a device which may be used in the manufacture of the spacer fabric for the laminate shown in FIG. 1 and illustrates the first stage of the production of the fabric.
Figure 11:
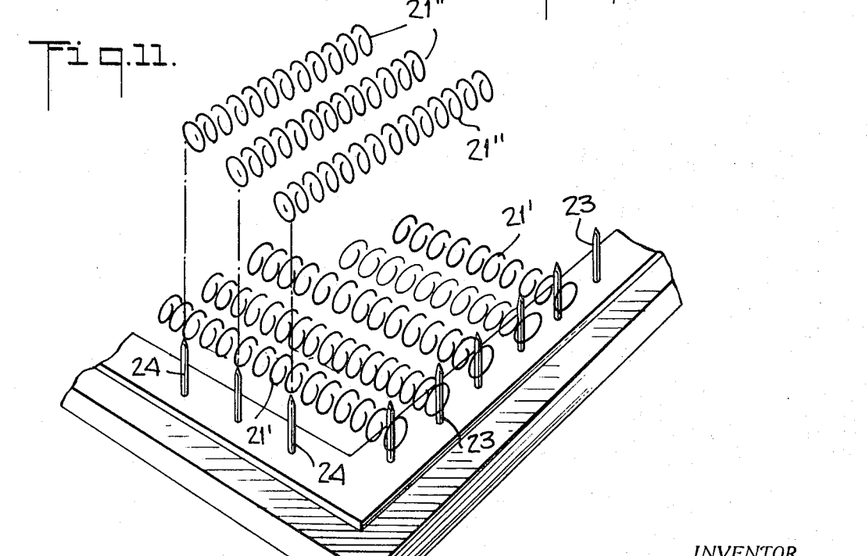
FIG. 11 is a fragmentary, perspective view of the device and illustrates the preliminary arrangement of the coils in the second stage of the production of the spacer fabric.

For the purpose of making a non-woven spacer fabric 20 of the type shown in FIG. 1, the method illustrated by FIGS. 10 and 11 is disclosed in the Steel application to be at the present the best mode of achieving the desired result. Merely by way of example, the following description will be in terms of the use of coil strands of helical configuration of the type illustrated at 21 in FIG. 7, i.e. having a circular cross-section of uniform diameter along the entire axial length of each strand, but it will be apparent that the same principles would apply to coil strands of oval or polygonal cross-section, e.g. triangular, square or rectangular, pentagonal, etc. as well.

More particularly, in accordance with the most basic aspects of this method, the spacer fabric may be produced with the aid of a preferably square or rectangular, generally tenter-like, frame 22 provided with two perpendicular sets of parallel rows of upstanding pins or pegs 23 and 24. Quite obviously, the frame may be either of a fixed size or constructed of separable sections adapted to have suitable pin-equipped removable inserts interposed therebetween. Alternatively, an associated pair of elongated bars designed to constitute two opposite sides of such a frame may be provided with aligned recesses or other attachment means to which suitable cross-bars designed to constitute the other sides of the frame may be releasably secured. It will be equally apparent that the sides of the frame and the opposed rows of pins need not necessarily be parallel to one another and that one or more of them may even be curved, thereby to enable non-square or non-rectangular fabric sections to be produced.

In the first stage of the production of such a fabric 20, a plurality of the coil strands 21 having either closely positioned turns as shown in FIG. 7 or more widely spaced turns, are laid across the frame 22, as indicated at 21' in FIGS. 10 and 11, and secured at their opposite ends in side by side relation to the oppositely disposed pairs of pins or pegs 23. The size of the frame may be such that the coil strands 21' will be stretched between about 0 and 900% of their original length. In the lower limiting case, therefore, the coils will be unstretched, but for reasons which will become clear as the description proceeds, in that event the turns of each coil strand will have to be spaced from one another. Above the lower limiting case, stretching the coil strands to between about 300 and 500% of their original relaxed state lengths is found to be preferred.

After a complete layer of coil strands 21' has been thus formed on the frame, a second set of unstretched or stretched coil strands 21, designated by reference numeral 21" in FIG. 11, is laid across the frame 22 over the first layer and secured in side by side relation to the oppositely located pairs of pins 24 in a direction perpendicular to the direction of the strands 21'. The so-formed second layer is then pressed against and compacted with the other one, causing the two sets of coil strands to be entangled and jointly disposed essentially in a common plane, i.e. with the locations of the fabric surface-defining zeniths and nadirs of the sets of coils being in respective essentially common planes which are parallel to one another and to the common plane of the axes of the various coil strands. It should be understood that within the purview of the present invention only one of the coil strand layers may be stretched while the other is unstretched.

Figure 5:
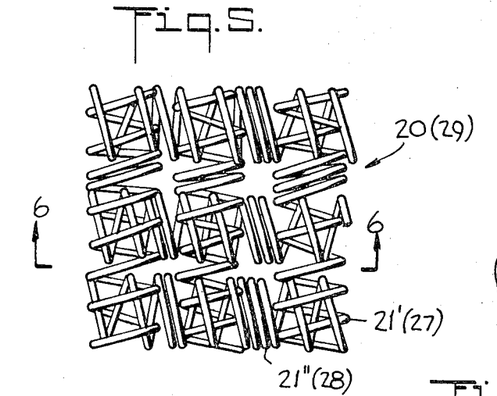
FIG. 5 is a fragmentary plan view of a non-woven spacer fabric such as is used in the laminate of FIGS. 1 to 4.
Figure 6:
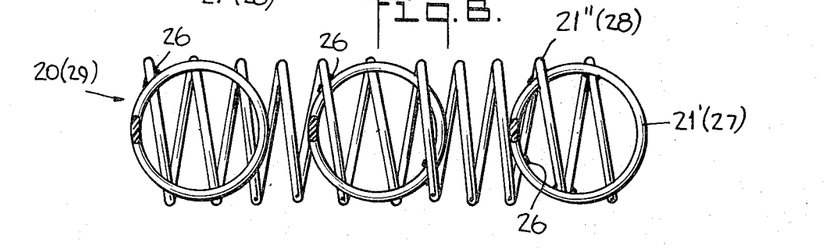
FIG. 6 is a sectional view taken along the line 6—6 in FIG. 5 but drawn on an enlarged scale.

In the case where one or both of the sets of coil strands are stretched, the entire coil strand assembly can now be removed from the frame, whereupon it will contract in one or both of the two transverse directions, due to the resiliency of the streched coil strands, but only to a limited extent, leaving the final fabric dimensions greater than the pre-assembly relaxed state axial lengths of the various coil strands in the direction of the stretched strands, preferably ranging from the 50 to 90% of the stretched lengths of the respective coil strands. As a result of the contraction, furthermore, the crossing coil strands will also be mechanically interlocked with one another as shown in FIGS. 5 and 6, even if only one set of coils contracts.

It will be understood that for many purposes and end uses, generally those of a static nature which entail no undue stresses and strains, the so-formed fabric, with the coil strands only mechanically interlocked, will have adequate strength and resistance to separation and require no after-treatment to enhance the cohesion of the strands. Where the fabric in use will be subjected to considerable dynamic stresses and strains, however, in particular flexure such as it will encounter when a laminate in which it is incorporated is used as wearing apparel, it is found advisable to subject the fabric to a further coil-connecting treatment so as to cause the two sets of coil strands to be either mechanically tied or bonded to one another at their points of intersection or crosspoints. Such a treatment, for example, may be an application of localized heating to fuse or bond the crossing strands to one another where they cross and are in contact, assuming that the nature of the material of which the strands are made admits of such a result.

Figure 12:
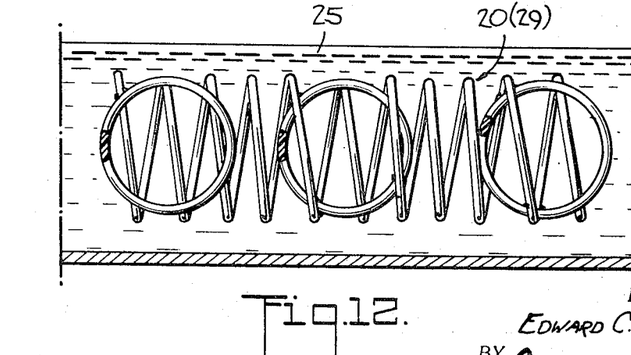
FIG. 12 is a diagrammatic illustration of one manner of applying a binder to the finished spacer fabric resulting from the compaction of the coil assembly shown in FIG. 11.

More preferred as the treatment, however, is the application of a "binder" (as hereinbefore defined) to the fabric to effect either a mechanical tying or an adhesive bonding of the crossing strands to one another where they cross or are in contact. One example of a binder application method is diagrammatically illustrated in FIG. 12 which shows the fabric 20 immersed in a bath 25 of such a binder, and although the fabric is shown as being immersed after being removed from the frame 22, it may just as well be so treated while still on the frame. Alternatively, the "binder" can be applied to the fabric, preferably while the latter is still on the frame, either by means of applicator rollers or by means of spraying devices. Thereafter, depending on the type of binder employed, the treated fabric will then have to be subjected to a final treatment, usually either a heating or cooling operation, to dry and/or fuse the binder. Where the latter is a room temperature curing material, of course, external heating or cooling will generally not be required and the final treatment may then consist merely of exposing the fabric to room temperature for a sufficient time interval to permit the binder to cure and set.

In the case where the coil strands are not stretched when laid onto the frame 22, one variation from the foregoing procedure which arises is that the application of a binder or a fusion treatment becomes essential to avoid the possibility that the coils, not being mechanically interlocked, could come apart during use of the fabric. Moreover, practical considerations based on the same possibility dictate that the application of the binder should also be made while the coil strand assembly is still on the frame (even though in theory the loose coil strand assembly could conceivably be lifted off the frame prior to the binder application).

Generally, and irrespective of whether stretched or unstretched coil strands are used, the amount of binder applied will only be such as to satisfy the bonding or tying requirements, e.g. after an immersion treatment, the excess will be drained off before it dries, leaving only the part trapped at the cross-over points of the coils, as at 26 in FIG. 6. As previously indicated, however, if found desirable for coil protection purposes, a sufficient amount of "binder" may be employed not only to effect the bonding or typing of the coils to each other but also to adequately coat the entire surface of each coil strand.

It will be understood that for the purpose of producing a spacer fabric from relatively short length coil strands as disclosed in the Steel application, the axial length of each coil strand as formed may initially be very great, in which case, after removal from the mandrel, it can be cut into the desired shorter lengths. Alternatively, of course, a larger number of relatively short coil strands of the desired axial lengths can be formed in the first instance.

In accordance with my invention, I have discovered that a spacer fabric having the same general characteristics can also be produced from the axially very long coil strands above referred to, without the same first being cut into shorter lengths, however. This is illustrated diagrammatically in FIG. 13. With this method, a continuous length coil strand 27 (here taken to have the cross-sectional configuration of the coil strand 21 shown in FIG. 7, although it may have those shown in FIGS. 8 and 9 or any other such as triangular, hexagonal, and the like as well) is laid in serpentine fashion across the frame 22, being passed back and forth between and around either single ones or pairs or otherwise multiple groups of the pins or pegs 23 depending on the configuration and spacing of the coil strand reaches desired. As before and subject to the same conditions, the coil strand reaches between opposed pins may be stretched or unstretched, i.e. extended to between about 0 and 900% of their original lengths.

Figure 13:
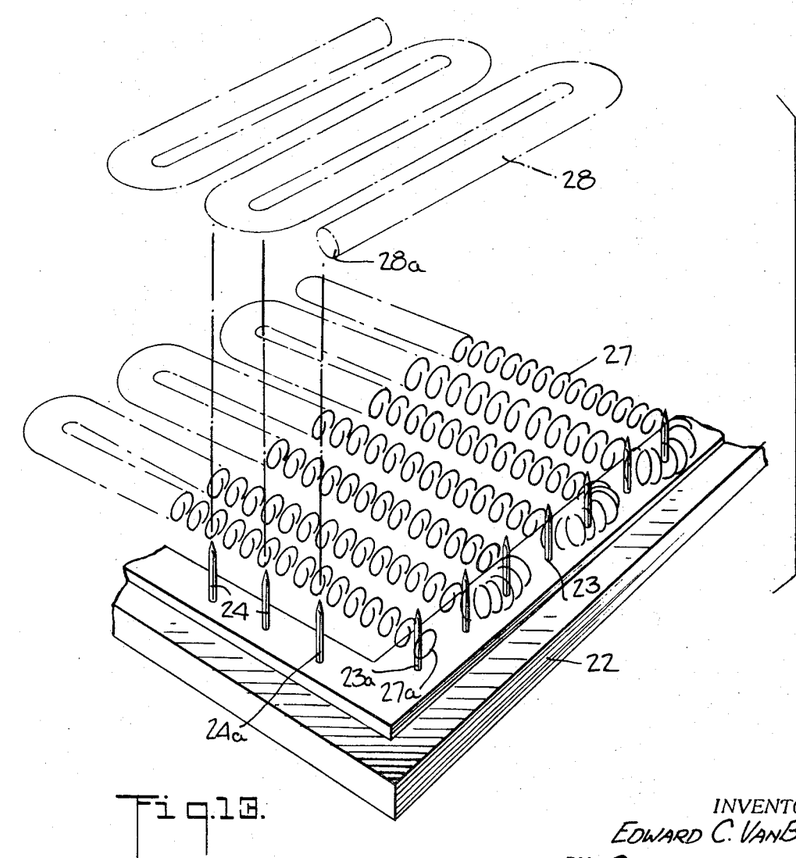
FIG. 13 is a fragmentary, perspective view of the same device as is shown in FIGS. 10 and 11 and illustrates the manner of making a spacer fabric according to the present invention from two serpentine coil strand layer structures.

After a complete layer of the coil strand 27 has been thus formed on the frame, a second such layer is formed thereover as indicated at 28, this second layer of either unstretched or stretched coil strand reaches being similarly serpentine in fashion but extending across the frame 22 between and about the oppositely located pins 24, so that these coil strand reaches extend crosswise to the reaches of the strand 27. It will be understood that these two layers may be formed of separate strands or of a single coil strand, in which case 27 and 28 would be one continuous strand joined at 27a–28a and passed from pin 23a to pin 24a when the first layer is finished and the second begun. The so-formed second layer is then pressed against and compacted with the other one, causing the two sets of coil strand reaches to be entangled and jointly disposed essentially in a common plane in the same manner as the strands 21' and 21" in FIG. 6. As in the case of those strands, within the purview of the present invention only one of the serpentine set of coil strand reaches may be stretched while the other is unstretched.

Upon removal of the so formed coil strand assembly from the frame, which again may be either prior or subsequent to the application of a binder (assuming that a binder is to be applied at all), the fabric 29 will either shrink or not, depending on whether or not and to what extent the coil strand reaches were stretched during the assembly operation and, of course, also on the nature of the materials employed and the "density" of the fabric. Any such contraction will, therefore, tend to interlock the crossing coil strand reaches mechanically, as previously explained, and by the same token the intended use of the laminate of which this spacer fabric is to form a part will determine whether or not the application of a binder is necessary. It should be noted that except for the side edges, the fabric 29 in plan will look exactly like the fabric 20 shown in FIG. 5.

It will further be understood that there is by and large no unique relationship which must be maintained between the parameters of coil diameter or cross-section on the one hand and the arrangement and spacing of the pins on the frame 22 on the other hand, other than that the spacing must be sufficient (a) to accommodate the coil strand reaches of each layer in non-interfering side by side relation during the assembly operation and (b) to ensure that even after removal of the fabric from the frame, especially if the fabric contracts, the coil arrangement is loose or open enough to afford unhampered flexibility.

Figures 2, 4:
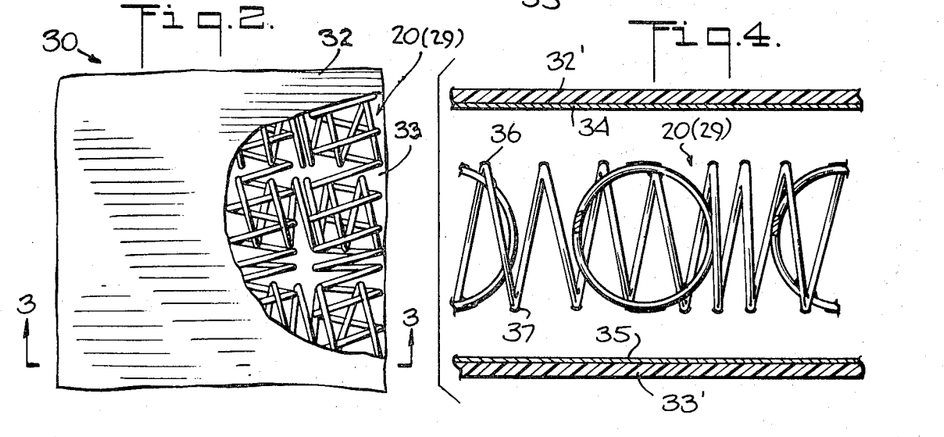
FIG. 2 is a fragmentary plan view, on an enlarged scale and partly broken away to show interior details, of a portion of a laminate of my invention.
FIG. 4 is an exploded sectional view similar to FIG. 3 and illustrates the method of forming a laminate according to the present invention.
Figures 3, 3A:
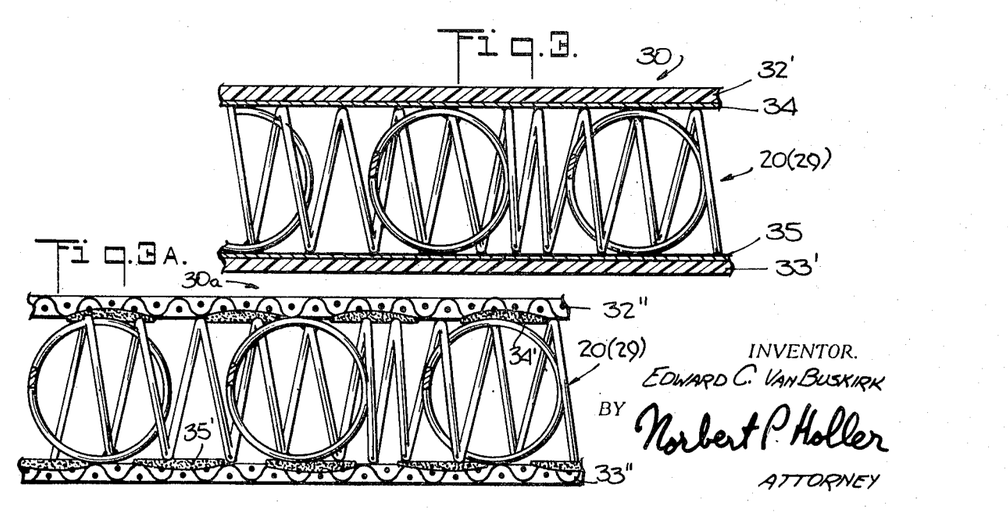
FIG. 3 is a fragmentary sectional view taken along the line 3—3 in FIG. 2 and drawn on a still more enlarged scale, with the skins being shown as composed of impermeable films or sheets.
FIG. 3a is a similar view with the skins being shown as composed of fabrics.
Figure 14:
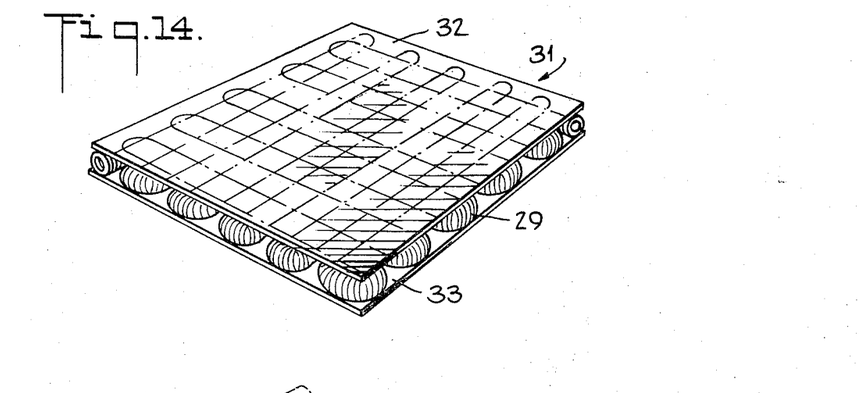
FIG. 14 is a perspective plan view, similar to FIG. 1, of a laminate according to a modified aspect of the present invention, wherein the spacer fabric is of the serpentine coil strand type shown in FIG. 13.

In order to form the laminates of the present invention, for example such as are designated 30 in FIGS. 1 to 3, 30a in FIG. 3a, and 31 in FIG. 14, respectively, the appropriate spacer fabric 20 or 29 is secured at both faces, preferably by means of an adhesive, to surface layers or skins 32 and 33. The latter may be, as indicated at 32' and 33' in FIG. 3, impermeable films or sheets of elastomeric or synthetic plastic material, of any of the types hereinbefore outlined, or they may be, as indicated at 32" and 33" in FIG. 3a, permeable or breathable plain or coated fabrics of any type having the requisite degree of stretch and flexibility, or they may be a combination thereof, i.e. a film and fabric laminate or an otherwise fiber-reinforced or fabric-reinforced film or sheet (not shown).

Referring now to FIG. 4, my preferred method of making such a laminate entails coating both of the skin-forming sheets 32 and 33, here shown to be impermeable films 32' and 33', with respective layers 34 and 35 of a suitable compatible adhesive of any of the types hereinbefore outlined, and also applying such adhesive to the surfaces of the spacer fabric as shown at 36 and 37 in FIG. 4, preferably by roller coating (although such other methods as surface dipping and spraying might also be imployed). For the actual laminating operation, any suitable method of joining the surface films or sheets to the spacer fabric may be used, but in view of the nature and state of the materials involved, a step by step building-up sequence is deemed at present to be the best way of achieving the desired result. A number of such sequences can be readily inferred from FIG. 4 and, by way of example, one such sequence might entail laying a first surface sheet or film (33') out flat, coating the same (as at 35) on its upper face, coating one face of the spacer fabric (20 or 29), laying the same, with its coated face down, onto the first surface sheet, coating the now upper face of the spacer fabric (as at 36), coating (as at 34) a second surface sheet or film (32'), and laying the same, with its coated face down, onto the upper face of the spacer fabric. If desired or deemed necessary, the laminate may then be subjected to a suitable pressure, and also to heat if the setting or curing of the adhesive requires elevated or above room temperatures.

One or both of these surface layers or skins 32 and 33 may, as previously indicated, be composed of a fiber- or fabric-reinforced sheet or film of elastomeric or plastic material, for example a film and a fabric or other fiber structure laminated together, or a film having the fibers or fabric embedded therein, or the like. Such an arrangement would be well suited for uses requiring relatively high resistance to cuts, tears and punctures, or requiring or permitting relatively lower or more controlled stretch properties than would be needed, say, in deep sea diving suits. By the same token, depending on the environmental conditions to be encountered in use, the two surface layers need not be made of the same material, for example one could be permeable and the other impermeable, or one could be a film or sheet of neoprene and the other of polyvinyl chloride, or one could be more stretchable than the other, etc. Where the spacer fabric is made of high electrical resistance wire, of course, the surface skins should be made of a material which is either non-thermoplastic or at least has a softening point well above any temperature to which the spacer fabric may be raised during use. It will also be appreciated that in the case of a heating wire spacer fabric, it might be well to insulate the wires either if the electrical insulating value of the surface skins is too low, or to guard against the possibility of punctures or cuts in the skins. Insulation would be of great advantage where both the warps and the fillings of a spacer fabric 29 are formed of one continuous coil strand, so as to provide the longest possible current path and thus the greatest possible electrical resistance and resultant heating.

The method illustrated by FIG. 4, or an equivalent thereof, may also be used to form a laminate such as 30a having fabric skins 32" and 33" (FIG. 3a). As previously mentioned, however, in this case some precautions would appear to be advisable to guard the fabric against undue impregnation, sealing or strike-through by the adhesive. To this end, extremely light adhesive films, or discontinuous adhesive layers, say in the form of discrete dots or lines as indicated diagrammatically at 34' and 35', may be used advantageously, as well as other fabric coating processes well known per se and not necessary to describe herein in detail.

The following examples will serve further to illustrate the present invention.

EXAMPLE I

Nylon mono-filament having a diameter of 0.012 inch is tightly wrapped in a series of successive contacting winds onto a 1/8 inch diameter steel rod or mandrel. The latter, with the filament still wound thereon, is then exposed to a temperature of about 365–378° F. in a hot air oven for 20 minutes, to heat set the nylon filament in coil form. Thereafter, 192 such coil strands each 7 inches long are mounted, in the manner set forth below, on a square frame open in the center and having a plurality of upstanding pins extending from its upper surface, the pins on each side of the frame being spaced about ¼ inch apart and being aligned with a corresponding set of pins on the opposite side, and the parallel rows of pins being 28 inches apart. In the mounting stage, the nylon coil strands thus are stretched by approximately 300% of their original length, and each stretched coil strand is hooked at its opposite ends to a respective pair of opposed and aligned pins. After a first layer of 96 such coil strands has been formed, a second layer of stretched coil strands is formed from the remaining 96 coil strands oriented transversely to the first ones and hooked to the opposed and aligned pins on the other two sides of the frame. The two layers are then forced against and compacted with each other, causing the coil strands of each set to become entangled with the perpendicular coils strands of the other set, until with the perpendicular coil strands of the other set, until uniplanar structure. After this assembly is removed from the frame, it contracts to yield a mechanically interlocked non-woven fabric corresponding to the teachings of the aforesaid Steel application and has shown in FIGS. 5 and 6 herein, the fabric having transverse dimensions of about 18 x 18 inches, i.e. about 64% of the lengths of the respective stretched coil strands.

The so formed spacer fabric is then laminated with two 0.010 inch thick impermeable films of cured neoprene, with both faces of the spacer fabric and one face to each of the films having applied thereto a thin coating of a solvent-based neoprene adhesive. The composite laminate is then subjected to a temperature of 200° F. for 30 minutes to dry and cure the adhesive.

This laminate is found to be highly flexible and elastic and resistant to compression and may advantageously be used as the suiting for environmental wearing apparel such as deep sea diving suits. The spacer fabric prevents collapse of the laminate even at relatively great depths (more than 100 feet) and provides an internal air space which not only materially enhances the thermal insulating value of the laminate but which also enables warm air or like fluid to be circulated through the laminate to replace lost body heat of the wearer.

EXAMPLE II

"Nichrome" mono-filament wire, having a diameter of 0.010 inch and coated with a modified polyester insulating varnish, is made into a coil of substantial length by being drawn and tightly wrapped about a ⅛ inch diameter steel rod or mandrel in a series of successive contacting winds. After removal from the mandrel, this coil strand is transformed into a first layer structure by being extended back and forth in serpentine fashion across and between one set of opposed pins of a frame such as used in Example I, while being stretched to approximately 300% of its original length. From the pin securing the last so formed reach of the first layer structure at one corner of the frame, the coil strand is passed around the next adjacent pin of one of the transverse rows thereof and then is formed into a second layer structure overlying the first one, with the reaches of the coil strand in this layer being oriented transversely to the coil strand reaches in the first layer, by being extended back and forth in serpentine fashion across the frame between the opposed pins of the second set. The two layers are then compacted and forced together, causing the crossing coil strand reaches of each layer to become entangled with the coil strand reaches of the other layer, until the entire assembly is transformed into an essentially uniplanar structure. Upon removal from the frame, the resultant non-woven fabric contracts to transverse dimensions of about 11 x 11 inches.

This spacer fabric is then laminated at its opposite faces with two 0.050 inch thick impermeable sheets of polyurethane elastomer, using a urethane adhesive formulated by blending 100 parts by weight of a polyether-polyurethane prepolymer with 10 parts of preheated (250° F.) methylene-bis-ortho-chloroaniline, the adhesive in the laminate then being cured for 2 hours at 212° F.

The resultant laminate is adapted to be internally heated, for the purpose of providing increased skin temperatures, by connecting the ends of the coil strand to a suitable voltage. source.

EXAMPLE III

A spacer fabric made as set forth in Example I is immersed, either prior or subsequent to removal from the frame, in a 10% solution of polyvinyl chloride in methyl ethyl ketone and then permitted to dry. The same urethane adhesive as was used in Example II is then sprayed onto the spacer fabric and spread coated onto one face of each of a pair of 0.010 inch thick sheets of plasticized polyvinyl chloride, and these sheets are then laminated to the opposite surfaces of the spacer fabric, the composite being heated to 212° F. for 2 hours to cure the adhesive.

EXAMPLE IV

A spacer fabric is made of 0.005 inch diameter nylon monofilament coil strands in the manner set forth in either Example I or Example II, and two skin-forming sheets are prepared, one an unreinforced sheet of plasticized polyvinyl chloride 0.010 inch thick, and the other a similar sheet reinforced by a cotton knit fabric calendered to the sheet to an overall thickness of 0.015 inch. One surface of the unreinforced sheet and the vinyl face of the reinforced sheet are coated with a 0.005 inch thick layer of polyvinyl chloride plastisol to serve as an adhesive. The spacer fabric is then sandwiched between the coated sides of these sheets, and the plastisol is fused by application of heat for 15 seconds at 310° F.

The laminates of the present invention may be utilized in a variety of applications other than controlled environment wearing apparel, e.g. as shock absorption material, insulation, carpeting or rug underlay, upholstery backing, etc. Other uses will readily suggest themselves to those skilled in the art. The intended use of such a laminate for and in any given environment or application may, of course, entail making the spacer fabric, as disclosed in the aforesaid Steel application, of coil strands of non-circular cross-section, or of coil strands of different materials.

It is to be understood that the foregoing disclosure of preferred embodiments of the present invention is for purposes of illustration only, and that the various structural and operational features and relationships described herein may be modified and changed in a number of ways none of which entails any departure from the spirit and scope of the present invention as defined in the hereto appended claims.

Having thus described my invention, what I claim and desire to protect by Letters Patent is:

1. An elastic laminate with high multi-directional stretchability, comprising a pair of skin-forming layers secured to and sandwiching therebetween a non-woven spacer fabric, the latter comprising a cohesive structure composed of two groups of resilient and highly extensible coil strand reaches of mono-filamentary nature, all coil strand reaches of each group crossing those of the other and being laid into and entangled therewith from one side only, and the axes of all said coil strand reaches being disposed in a single common plane.

2. A laminate according to claim 1, at least one of said skin-forming layers being secured to said spacer fabric by means of an adhesive.

3. A laminate according to claim 1, at least one of said skin-forming layers being an unsupported sheet of elastomeric material.

4. A laminate according to claim 1, the mono-filament constituting at least some of said coil strand reaches being made of a material selected from the group consisting of fibers of natural and synthetic rubber and synthetic plastic materials.

5. A laminate according to claim 1, the mono-filament constituting at least some of said coil strand reaches being made of glass fiber.

6. A laminate according to claim 1, the mono-filament constituting at least some of said coil strand reaches being made of a material selected from the group consisting of threads and yarns of fibrous material impregnated with a material selected from the group consisting of natural and synthetic rubbers and resins.

7. A laminate according to claim 1, said coil strand reaches of said spacer fabric in at least one of the warp and filling directions thereof being parts of a continuous coil strand arranged in serpentine fashion.

8. A laminate according to claim 1, said coil strand reaches of said spacer fabric in both the warp and filling directions thereof being parts of a single continuous coil strand arranged in serpentine fashion.

9. A laminate according to claim 1, the spacer fabric edge to edge dimensions in each direction of orientation of said coil strand reaches being, by virtue of a contraction of said coil strand reaches of at least one of said groups from a stretched state imparted thereto prior to and during the laying thereof into the coil strand reaches of the other group, between about 50 and 90% of the axial lengths of the various stretched coil strand reaches oriented in the respective direction.

10. A laminate according to claim 1, the monofilament constituting at least some of said coil strand reaches being made of metal wire.

11. A laminate according to claim 10, said wire being a high electrical resistance wire.

12. A laminate according to claim 1, at least one of said skin-forming layers being a fibrous structure-reinforced sheet of elastomeric material.

13. A laminate according to claim 12, at least said one skin-forming layer being constituted by said elastomer sheet and a high-stretch fabric laminated thereto.

14. A laminate according to claim 13, at least said one skin-forming layer being secured to said spacer fabric with said elastomer sheet thereof engaging the latter.

15. An elastic non-woven fabric with high multi-directional stretchability, comprising a cohesive structure composed of two groups of resilient and highly extensible coil strand reaches of mono-filamentary nature, all coil strand reaches of each group crossing those of the other and being laid into and entangled therewith from one side only, the axes of all said coil strand reaches being disposed in a single common plane, and said coil strand reaches in at least one of the crossing directions being parts of a continuous coil strand arranged in serpentine fashion.

16. A non-woven fabric according to claim 15, said groups of coil strand reaches being laid one into the other while in their relaxed and unstretched states, and the crossing coil strand reaches being connected to one another by means of a binder at their points of intersection to render the structure cohesive.

17. A non-woven fabric according to claim 15, wherein all of the coil strand reaches in each of the crossing directions are parts of a respective continuous coil strand arranged in serpentine fashion.

18. A non-woven fabric according to claim 15, wherein all of the coil strand reaches in both of the crossing directions are parts of a single continuous coil strand arranged in serpentine fashion.

19. A non-woven fabric according to claim 15, the two groups of coil strand reaches being mechanically interlocked, by virtue of a contraction of said coil strand reaches of at least one of said groups from a stretched state imparted thereto prior to and during the laying thereof into the coil strand reaches of the other group, to render the structure cohesive.

20. A non-woven fabric according to claim 19, the crossing entangled coil strand reaches further being connected to one another by means of a binder at their points of intersection.

21. The process of making an elastic non-woven fabric with high multi-directional stretchability, comprising the steps of providing two groups of resilient and highly extensible coil strand reaches of mono-filamentary nature in respective superposed single layer formations, with said coil strand reaches of each of said groups being arranged in crossing relation to said coil strand reaches of the other group on one side only thereof, and with said coil strand reaches of at least one of said groups being formed by arranging a continuous coil strand in serpentine fashion, compacting said groups of coil strand reaches each into the other from one side only to the form of a structure having the crossing coil strand reaches entangled with each other and having the axes of all coil strand reaches disposed in a single common plane, and treating the assembly of coil strand reaches to render the structure cohesive.

22. The process of claim 21, wherein said groups of coil strand reaches are laid one into the other while in their relaxed and unstretched states, and said treating step comprises interconnecting said entangled crossing coil strand reaches to one another by means of a binder at their points of intersection.

23. The process of claim 21, wherein both of said groups of coil strand reaches are parts of respective continuous coil strands arranged in serpentine fashion.

24. The process of claim 21, wherein all of said groups of coil strand reaches are parts of a single continuous coil strand arranged in serpentine fashion.

25. The process of claim 21, wherein at least one of said groups of coil strand reaches is in a stretched state while one is being laid and compacted into the other, and said treating step comprises the relaxing the stretching forces to permit the stretched coil strand reaches to contract and effect a mechanical interlocking of the crossing coil strand reaches at their points of intersection.

26. The process of claim 25, wherein the extent of stretching of said coil strand reaches ranges up to about 900% of their relaxed state lengths prior to the compaction operation.

27. The process of claim 25, wherein the extent of stretching of said coil strand reaches ranges up to about 500% of their relaxed state lengths prior to the compaction operation.

28. The process of claim 25, further comprising the step of interconnecting said entangled crossing coil strand reaches to one another by means of a binder at their points of intersection.

29. The process of claim 28, wherein the binder is applied to said coil strand reaches prior to the relaxation of the stretching forces.

30. The process of claim 28, wherein the binder is applied to said coil strand reaches subsequent to the relaxation of the stretching forces.

31. The process of making an elastic non-woven fabric with high multi-directional stretchability, comprising the steps of securing a first continuous resilient and highly extensible coil strand of mono-filamentary nature in serpentine fashion and in stretched condition to and between a respective associated pair of sets of anchoring elements so as to define a first single layer formation, securing a second continuous resilient and highly extensible coil strand of mono-filamentary nature in serpentine fashion and in stretched condition to and between a respective associated pair of anchoring elements, with the reaches of said second coil strand in crossing relation to the reaches of said first coil strand, so as to define a second single layer formation in superposed relation to said first layer formation, pressing said layer formations against one another to compact said coil strand reaches into a structure having the crossing coil strand reaches entangled with each other and the axes of all coil strand reaches disposed in a single common plane, and releasing said coil strands from their respective anchoring elements to permit said structure to contract in all directions so as to cause said coil strand reaches to become mechanically interlocked and render the structure cohesive.

32. The process of making an elastic non-woven fabric with high multi-directional stretchability, comprising the steps of securing a continuous resilient and highly extensible coil strand of mono-filamentary nature in serpentine fashion and in stretched condition to and between a first pair of sets of anchoring elements so as to define a first single layer formation of coil strand reaches, thereafter securing the remainder of said coil strand in serpentine fashion and in stretched condition to and between a second pair of sets of anchoring elements transverse to said first sets so as to define a second single layer formation of coil strand reaches in superposed and crossing relation to said coil strand reaches of said first layer formation, pressing said layer formations against one another to compact said coil strand reaches into a structure having the crossing coil strand reaches entangled with each other and the axes of all coil strand reaches disposed in a single common plane, and releasing said coil strand from the respective anchoring elements to permit said structure to contract in all directions so as to cause said coil strand reaches to become mechanically interlocked and render the structure cohesive.

References Cited
UNITED STATES PATENTS

| | | | |
|---|---|---|---|
| 3,449,199 | 6/1969 | Mead | 161—47 |
| 3,133,852 | 5/1964 | Crane et al. | 161—47 |
| 3,380,484 | 4/1968 | Kraszeski | 140—3X |
| 3,022,063 | 1/1962 | Crane et al. | 161—47X |

HAROLD ANSHER, Primary Examiner

J. C. GIL, Assistant Examiner

U.S. Cl. X.R.

140—3; 156—166, 181, 229; 161—49, 59, 76, 77, 93, 71, 72; 245—6

PO-1050
(5/69)

UNITED STATES PATENT OFFICE
CERTIFICATE OF CORRECTION

Patent No. 3,562,082　　　　　　　Dated February 9, 1971

Inventor(s)　Edward C. Van Buskirk

It is certified that error appears in the above-identified patent and that said Letters Patent are hereby corrected as shown below:

Column 3, line 12, "fabrics" should read --fibers--; column 7, line 57, "the" should read --about--; column 8, line 51, "typing" should read --tying--; column 11, line 19, "with the perpendicular coil strands of the other set, until" should read --the entire assembly is transformed into an essentially column 11, line 23, "has" should read --as--; column 11, line 29, "to" should read --of--; column 14, line 37, "comprises the" should read --comprises--.

Signed and sealed this 25th day of April 1972.

(SEAL)
Attest:

EDWARD M. FLETCHER, JR.　　　　　ROBERT GOTTSCHALK
Attesting Officer　　　　　　　　Commissioner of Patents